(12) United States Patent
Wilensky

(10) Patent No.: US 7,071,948 B2
(45) Date of Patent: Jul. 4, 2006

(54) ADJUSTING IMAGES BASED ON PREVIOUS MODIFICATIONS

(75) Inventor: Gregg D. Wilensky, Pacific Palisades, CA (US)

(73) Assignee: Adobe Systems Incorporated, San Jose, CA (US)

( * ) Notice: Subject to any disclaimer, the term of this patent is extended or adjusted under 35 U.S.C. 154(b) by 58 days.

(21) Appl. No.: 10/690,977

(22) Filed: Oct. 21, 2003

(65) Prior Publication Data

US 2005/0083347 A1 Apr. 21, 2005

(51) Int. Cl.
*G09G 5/00* (2006.01)

(52) U.S. Cl. ....................................... 345/581; 345/589
(58) Field of Classification Search ................. 345/581, 345/589, 593, 594, 595, 596, 597; 382/162, 382/167, 274
See application file for complete search history.

(56) References Cited

U.S. PATENT DOCUMENTS

| | | | |
|---|---|---|---|
| 5,446,504 A | | 8/1995 | Wada |
| 6,191,823 B1 | * | 2/2001 | Ahn ........................... 345/660 |
| 6,204,858 B1 | * | 3/2001 | Gupta ......................... 345/600 |
| 6,438,264 B1 | | 8/2002 | Gallagher et al. |
| 6,813,335 B1 | * | 11/2004 | Shinbata ..................... 382/130 |
| 2002/0141640 A1 | | 10/2002 | Kraft |
| 2002/0186387 A1 | | 12/2002 | Moroney et al. |
| 2003/0001856 A1 | * | 1/2003 | Sawada et al. ............. 345/581 |
| 2003/0099411 A1 | * | 5/2003 | Kokemohr ................... 382/309 |
| 2003/0131237 A1 | * | 7/2003 | Ameline et al. ............ 713/176 |
| 2003/0234960 A1 | * | 12/2003 | Kaltenbach et al. ........ 358/3.24 |
| 2004/0125983 A1 | * | 7/2004 | Reed et al. ................. 382/100 |

OTHER PUBLICATIONS

"Adjusting Brightness and Contrast", http://support2.epson.net/manuals/english/scanner/perfection2450photo/REF_G/OPTMZ_2.HTM, Version 1.00E, 2002, Seiko Epson Corporation, 11 pages.

Zia–ur Rahman, "A Multiscale Retinex for Color Rendition and Dynamic Range Compression," SPIE International Symposium on AeroSense, Visual Information Processing IX, Apr. 2000.

Gregory Ward Larson, et al, "A Visibility Matching Tone Reproduction Operator for High Dynamic Range Scenes," IEEE Transactions on Visualization and Computer Graphics, vol. 3, No. 4, Oct.–Dec., 1997, pp. 291–306.

"DIGITAL SHO Plug–In", http://www.asf.com/products/plugins/sho/pluginSHO.asp, 2001–2003, Eastman Kodak Company, 2 pages.

Arthur R. Weeks, Jr., *Fundamentals of Electronic Image Processing*, SPIE Optical Engineering Press, USA, 1996, Chapter 3, pp. 90–120.

"Highlight Midtone and Shadow", http://www.caisse.com.au/pituts/hmsarticle/hms01.htm, 2003, Caisse, 11 pages.

Fraser, "Out of Gamut: Don't Underestimate Photoshop's Auto Color", http://www.creativepro.com/story/feature/17164.html, Jul. 23, 2002, Creativepro.com, 12 pages.

(Continued)

*Primary Examiner*—Matthew Luu
(74) *Attorney, Agent, or Firm*—Fish & Richardson P.C.

(57) ABSTRACT

Methods and apparatus, including computer program products, for processing a digital image. The digital image is modified at a location within the image. The modification causes a change of a first local attribute of the image at the location. The change of the first attribute is measured at the location. A second attribute of the image is adjusted at the location based on the measured change of the first local attribute, where the second attribute is different from the first attribute.

32 Claims, 3 Drawing Sheets

OTHER PUBLICATIONS

"Single Click Fixes in Photoshop Album", http://www.dummies.com/WileyCDA/DummiesArticle/id–2039.html, Adapted from Photoshop Album for Dummies, Wiley Publishing, Inc., Jul., 2003, 6 pages.

J. Tumblin and H. Rushmeier, "Tone Reproduction for Realistic Images," IEEE Computer Graphics and Applications, Nov. 1993, 13(6), 42–48.

"Using Adobe Photoshop's "Auto Contrast" Feature", http://www.lonestardigital.com/autocontrast.htm, Copied from Adobe Magazine/May–Jun., 2000, 5 pages.

Chang et al., "Optimal Histogram Matching by Monotone Gray Level Transformation", *Communications of the ACM USA,* Oct. 1978, vol. 21, No. 10, pp. 835–840.

King, "Two Adaptive Neural Networks for Image Histogram Processing", *Proceedings to the 1995 International Symposium on Artifical Neural Networks,* 1995, Obtained from the Internet at www.cse.cuhk.edu.hk/~king/PUB/isann95.ps>6 pages.

Gonzalez et al., "Digital Image Processing", Prentice Hall, 2001, pp. 94–103.

\* cited by examiner

ADJUSTING IMAGES BASED ON PREVIOUS MODIFICATIONS

BACKGROUND

The present invention relates to processing digital images.

An electronic image, such as a digital image, can be represented by an array of closely packed pixels that are basic picture elements. Each pixel represents a local portion of the image and alone or together with other pixels, determines graphical attributes for the local portion. The graphical attributes can include gray-level, color, chrominance (such as hue and saturation), luminance or transparency. Electronic images can be generated by graphical software applications or electronic devices such as scanners or digital cameras. The graphical software applications include presentation, animation, painting and design applications. The generated image can be further processed by the same or another device or application. During image processing, graphical attributes can be adjusted by changing attributes of pixels in the image to achieve various visual effects, such as adjusting brightness, contrast or color.

SUMMARY

After detecting a change in a first graphical attribute of an image at a location within the image, a second graphical attribute of the image is adjusted at the location with an amplitude that is modulated according to the change of the first graphical attribute at the location. In general in one aspect, the invention provides methods and apparatus, including computer program products, for processing a digital image. The digital image is modified at a location within the image. The modification causes a change of a first local attribute of the image at the location. The change of the first attribute is measured at the location. A second attribute of the image is adjusted at the location based on the measured change of the first local attribute, where the second attribute is different from the first attribute.

Particular implementations can include one or more of the following features. Modifying the digital image can include applying a tone selective local adjustment at the location, or changing contrast or brightness of the image at the location. The tone selective local adjustment can specify separate adjustments for shadows and highlights. The first attribute can be luminance, and the second attribute can be chrominance, such as color saturation. Adjusting the second attribute can include applying a filter at the location. The filter can sharpen or blur the image. The first attribute can be chrominance and the second attribute can be luminance. Measuring a change of the first attribute can include measuring an absolute change or a relative change of the first attribute. The adjustment to the second attribute can be proportional to the measured change of the first attribute. Adjusting the second attribute of the image can include applying a directional correction that applies if the first local attribute has a specific change.

The invention can be implemented to realize one or more of the following advantages. After the image is modified to adjust a first attribute in the image, a second attribute of the image can be corrected only at the locations where the first attribute has been changed. The second attribute is corrected without introducing a global change in the image or manually specifying a mask to limit the correction to specific regions. For example, after adjusting contrast or luminance in shadow regions of the image, a color correction can automatically be limited to the modified shadow regions without altering colors in midtone or highlight regions. Or color corrections can be limited to previously adjusted highlight regions without altering colors in midtone or shadow regions. In an image that is taken by a digital camera having different color sensitivity at different luminance levels, colors may be distorted when luminance is adjusted in one or more regions within the image. Such color distortions can be corrected in a next step without manually defining a mask for the color correction. Thus after brightening or darkening under or overexposed regions, colors can be restored in the brightened or darkened regions without modifying colors in correctly exposed regions. Alternatively, a color adjustment can be followed by a luminance correction that is limited to those regions in which the color adjustment has changed chrominance. Or after brightening underexposed regions, noise artifacts can be reduced in the brightened regions. The noise artifacts are reduced without altering other regions in the image. The noise artifacts can be caused by digitization techniques, such as defining JPEG blocks. Noise is also caused by sensors in digital cameras, CCD or other image capturing devices. The noise can be reduced by applying blurring or any other filtering to the brightened regions. Previously adjusted regions can also be sharpened. Instead of the adjusted regions, the non-adjusted regions can be sharpened (or adjusted in any other way) without altering the regions where chrominance or luminance has been previously adjusted.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
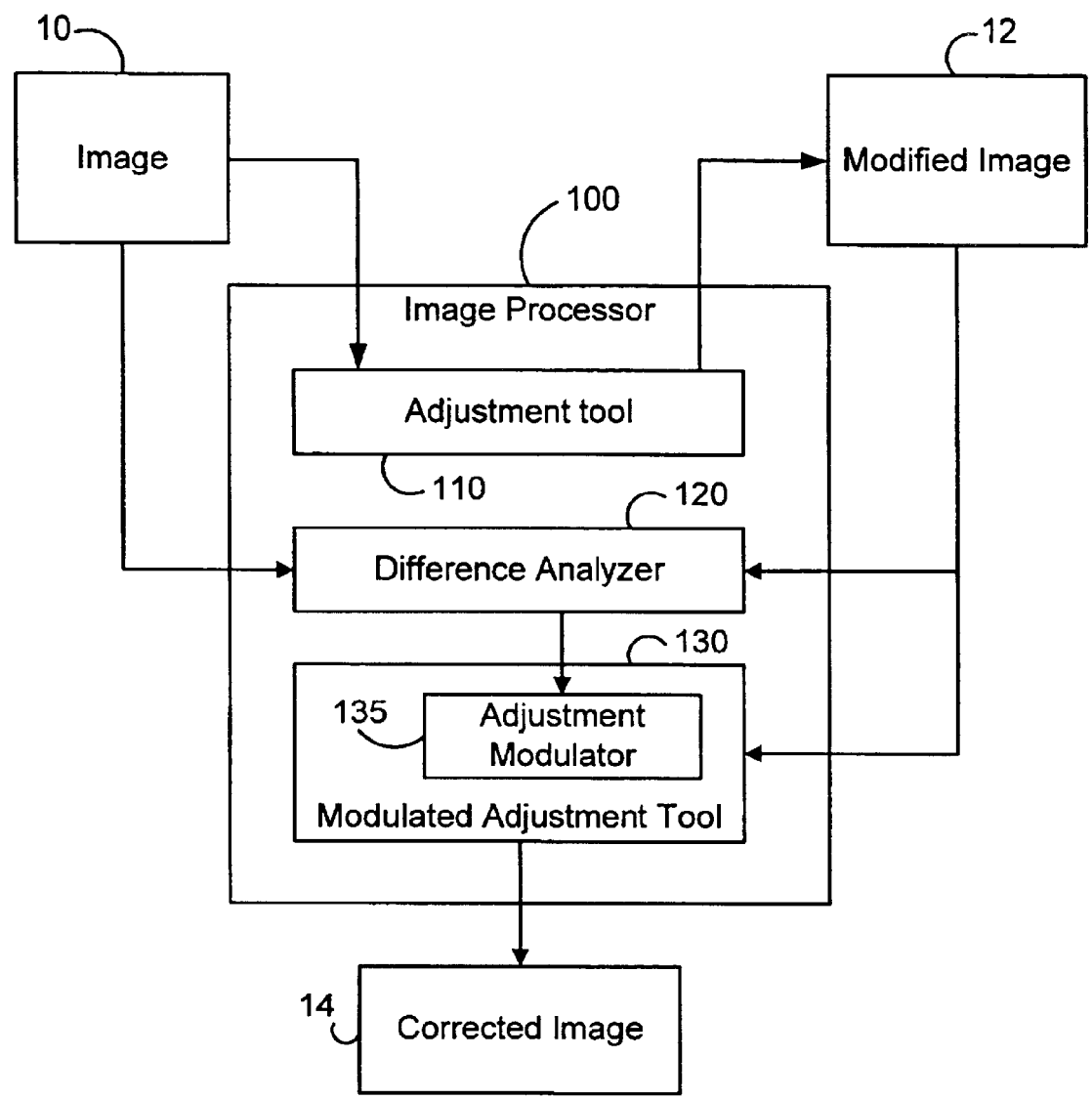
FIG. 1 is a schematic diagram illustrating an image processor for modulated adjustment.

FIG. 1 illustrates an image processor 100 for modulated adjustment of a digital image 10. The image 10 is a digital image in which pixel attributes are specified by numerical values in a bitmap. For digital images, the image processor 100 is implemented in one or more software applications or as a plug-in to a software application. Optionally, the image processor 100 can be implemented in hardware. Alternatively, the received image can be specified by analog electronic signals in electronic devices such as cameras and scanners. Such analog signals are digitized before processing the image 10. Or the analog signals are processed by an analog data processing apparatus in the image processor 100.

The image processor 100 includes an adjustment tool 110, a difference analyzer 120 and a modulated adjustment tool 130. The adjustment tool 110 receives the electronic image 10 and generates a modified image 12. The difference analyzer 120 determines differences of a local attribute between the electronic image 10 and the modified image 12. Based on the differences of the local attribute, the modulated adjustment tool 130 adjusts another local attribute in the modified image 12 to generate a corrected image 14.

The adjustment tool 110 adjusts one or more attributes of pixels in the image 10 to generate the modified image 12. The adjusted pixel attributes specify gray-level, chrominance, luminance or transparency. Thus the adjustment tool 110 can adjust contrast, brightness, color hue or color saturation in the entire image 10, or apply various filters or non-linear mappings to the image 10. The adjustment tool 110 can also perform tone selective adjustments as described in U.S. patent application Ser. No. 10/678,366, filed on Oct. 03, 2003, entitled "Tone Selective Adjustment of Images," the entire disclosure of which is hereby incorporated by reference in its entirety. Tone selective adjustments adjust attributes of the image differently in different tonal regions in the image 10. Thus shadows and highlights can be separately adjusted. In alternative implementations, the electronic image 10 is modified by another image processor from which the image processor 100 receives the modified image 12.

The difference analyzer 120 compares the electronic image 10 and the modified image 12 to determine changes of a local attribute for each pixel. The local attribute is selected to measure the changes caused by previous adjustments to the image 10. The selected attribute is based luminance to measure changes caused by adjusting contrast or brightness in the image 10. Or the local attribute is based on color hue or saturation to measure changes caused by adjustments to color balance or saturation in the image.

After adjusting contrast or brightness using the adjustment tool 110, the difference analyzer 120 measures a change of a local attribute ("LA") at a pixel in the image. The local attribute is directly proportional to a luminance value ("L"). In RGB color space, luminance is defined by the pixel's red ("R"), green ("G") and blue ("B") color value as $$L = 0.30R + 0.59G + 0.11B.$$

The local attribute can also include a contribution from a maximum color value of the pixel, such as Vmax=Maximum [R, G, B]. Instead of RGB color space, the local attribute can be defined in other color spaces, such as L*a*b*, CMYK and various perceptual color spaces including RLAB and logarithmic Lab. For example, luminance is explicitly defined in L*a*b* color space by the component 'L.'

After adjusting chrominance using the adjustment tool 110, the difference analyzer 120 measures a change of a local attribute whose value is based on saturation or hue of a color specified by a pixel in the electronic image 10. The local attribute has a single component or multiple components. A single-component local attribute can be based on a combination of saturation and hue. A multiple-component local attribute can include separate saturation and hue components. In L*a*b* color space, the local attribute can include both an 'a' component and a 'b' component. Methods for determining changes of a The modulated adjustment tool 130 adjusts the modified image 12 to generate the corrected image 14. The modulated adjustment tool 130 uses the changes of a first local attribute determined by the difference analyzer 120 in adjusting a second, different attribute of the modified image 12. For a first local attribute measuring luminance changes, the modulated adjustment tool 130 specifies a chrominance adjustment. The chrominance adjustment has a maximum strength that is based on user input or attributes of the modified image 12. The maximum strength of the chrominance adjustment can also be based on an average strength of the measured luminance changes.

At each location within the image, the strength of the chrominance adjustment is modulated by the luminance change measured at the location. Chrominance is not adjusted at locations where luminance has essentially not been changed by previous adjustments, and chrominance is adjusted with the maximum strength where luminance has substantially changed. Thus the modulated adjustment tool 130 can correct color distortions that are induced by increasing contrast in under or overexposed regions of the image.

Alternatively, the modulated adjustment tool 130 can specify a luminance adjustment that has a strength that is modulated at each pixel in the image by previous changes of chrominance. Thus the modulated adjustment tool 130 can correct luminance fluctuations that are induced by previous adjustments to chrominance. Or the modulated adjustment tool 130 can specify filters to sharpen, blur or otherwise filter the previously adjusted regions. The filters can reduce noise in the previously adjusted regions without altering the unadjusted regions. Instead of previously adjusted regions, the modulated adjustment tool 130 can limit a new adjustment to the previously unadjusted regions.

Figure 2:
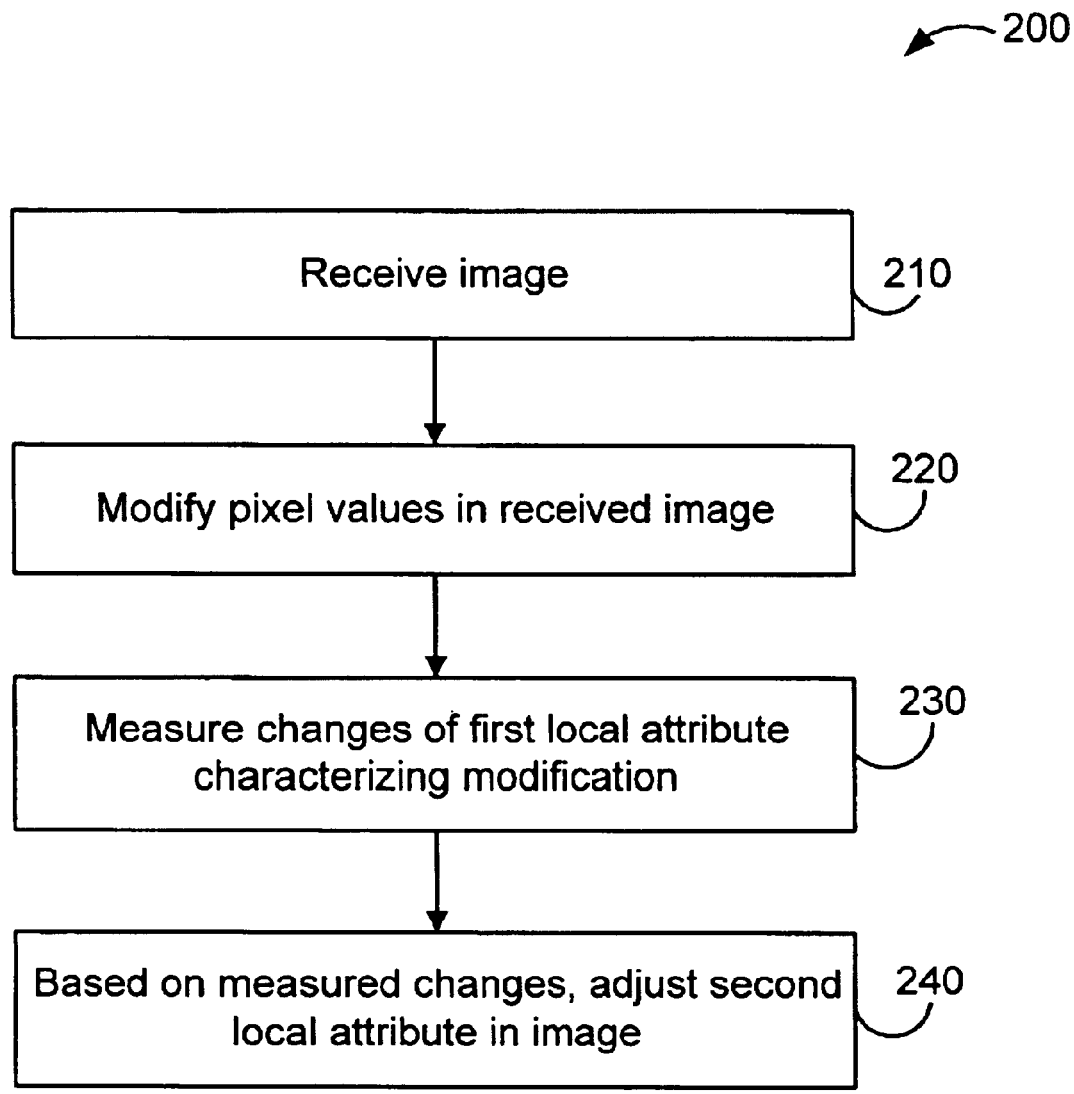
FIG. 2 is a schematic flow diagram illustrating a method for adjusting an image.

FIG. 2 illustrates a method 200 for adjusting images. The method 200 can be performed by a system including the image processor 100 (FIG 1). The system receives an electronic image (step 210). The received image is a digital or an analog image that includes multiple pixels in a pixel array where each pixel characterizes a local portion of the image. Or the received image can be specified by vector graphics, and the system can rasterize the image onto a pixel array.

The system modifies one or more pixel values in the received image to generate a modified image (step 220). The system modifies the received image to adjust attributes specified by pixels in the image. The adjusted attributes can include contrast, brightness, color saturation, color balance or any other graphical attributes of the image. The system uses one or more adjustment tools to modify the image. In one implementation, the system performs a tone selective adjustment to separately adjust shadows or highlights in the image.

The system measures changes of a first local attribute (step 230). The first local attribute is selected to characterize local changes between the received and the modified image. Adjustments to contrast or brightness are characterized by luminance changes, and adjustments to color balance or saturation are characterized by chrominance changes. Alternatively, the local attribute can be based on luminance to characterize any adjustment to the received image.

The system specifies a change of the first local attribute ("LA") for each pixel. The system determines an initial ("LA0") and a modified ("LA1") attribute value for the first local attribute at the same pixel in the received and the modified image, respectively. The system defines a relative change ("dLA") for the pixel as $$dLA = |LA1 - LA0| / [\tfrac{1}{2}(LA1 + LA0)].$$

For each pixel, the relative change dLA measures a change of the first local attribute LA between the received and modified images at the pixel. For pixels at which the first local attribute is essentially unchanged, the corresponding relative change dLA has a value of about zero. For pixels at which adjustment to the first local attribute LA is in the same order as the original value, the corresponding relative change dLA is substantially different from zero.

Alternatively, the system can use other measures for characterizing a change of the first local attribute. For example, an absolute change ("DLA") of the local attribute is defined as $$DLA=|LA1-LA0|.$$

The absolute change DLA is in the same order as the initial LA0 and modified LA1 attribute values. Thus for small initial and modified values of the first local attribute, the absolute change DLA is smaller than the relative change dLA.

When the first local attribute has multiple components, the system measures a change based on differences in each component. For a pixel in L*a*b* color space, chrominance is defined by the components 'a' and 'b'. The system defines a relative color change ("dC") that compares an initial chrominance (a0, b0) in the received image with a modified chrominance (a1, b1) in the modified image as $$dC=[(a1-a0)^2+(b1-b0)^2]/[a0^2+b0^2+a1^2+b1^2]$$

Alternatively, the system can define an absolute color change DC as $$DC=[(a1-a0)^2+(b1-b0)^2].$$

The system can also use the Euclidian distance defined by square root of the absolute color change as Sqrt(DC) or any other definition of distance between the initial (a0, b0) and modified (a1, b1) chrominances. Instead of a square root, the color change can also be measured by another power of the absolute or relative color change. Or the relative color change can have another normalization.

Based on the measured changes of the first local attribute, the system adjusts a second local attribute in the image (step 240). The second local attribute is different from the first local attribute. If the first local attribute is luminance, the system adjusts chrominance, sharpness or any other graphical attribute that is different from luminance. For a first local attribute measuring chrominance, the system adjusts luminance, sharpness or other local attribute that is not directly related to the chrominance measured by the first attribute.

The system defines a characteristic strength for adjusting the second local attribute of the image. The characteristic strength is a maximum or an average strength, which can be based on user input. For example in a user interface, a user can set the characteristic strength with a slider or a dialog box. The system can allow the user to adjust the second local attribute interactively. Each time the user sets a new characteristic strength, the system performs the corresponding correction on the previously adjusted image. Without user input, the system sets the characteristic strength to a default value. Optionally, the system analyzes the image to determine a value for the characteristic strength. The determined value can be used as a default value or to initialize the characteristic strength in a user interface.

For each pixel in the image, the second attribute is adjusted according to a local amplitude that is determined by modulating the characteristic strength according to the change of the first attribute at the pixel. The local amplitude is a non-negative monotonously increasing or decreasing function of the measured change of the first attribute. For a monotonously increasing function, the local amplitude increases from zero to one as the change of the first attribute increases from zero to a maximum. Accordingly, the more the first attribute has changed, the more the second attribute is adjusted. Thus the second attribute is corrected only at locations where the first attribute has changed in a previous adjustment.

A complementary use is defined by a monotonously decreasing function for which the local amplitude is decreasing from one to zero as the change of the first attribute increases from zero to a maximum. Accordingly, the less the first attribute has changed, the more the second attribute is adjusted. Thus the second attribute can be corrected at locations where the first attribute has not changed in a previous adjustment.

As discussed above, the absolute change DLA is smaller than the relative change dLA for small values of the first local attribute. Thus for correcting previously adjusted regions, the relative change specifies larger local amplitudes for small values of the first local attribute than the absolute change. If the first attribute is based on luminance, small attribute values represent shadows and large attribute values represent highlights. Thus the relative change gives larger correction for shadows than highlights, and the absolute change gives larger correction for highlights than shadows. When colors are corrected, using the relative change can boost the color correction for shadows where digital cameras are typically less sensitive to colors.

Figure 3:
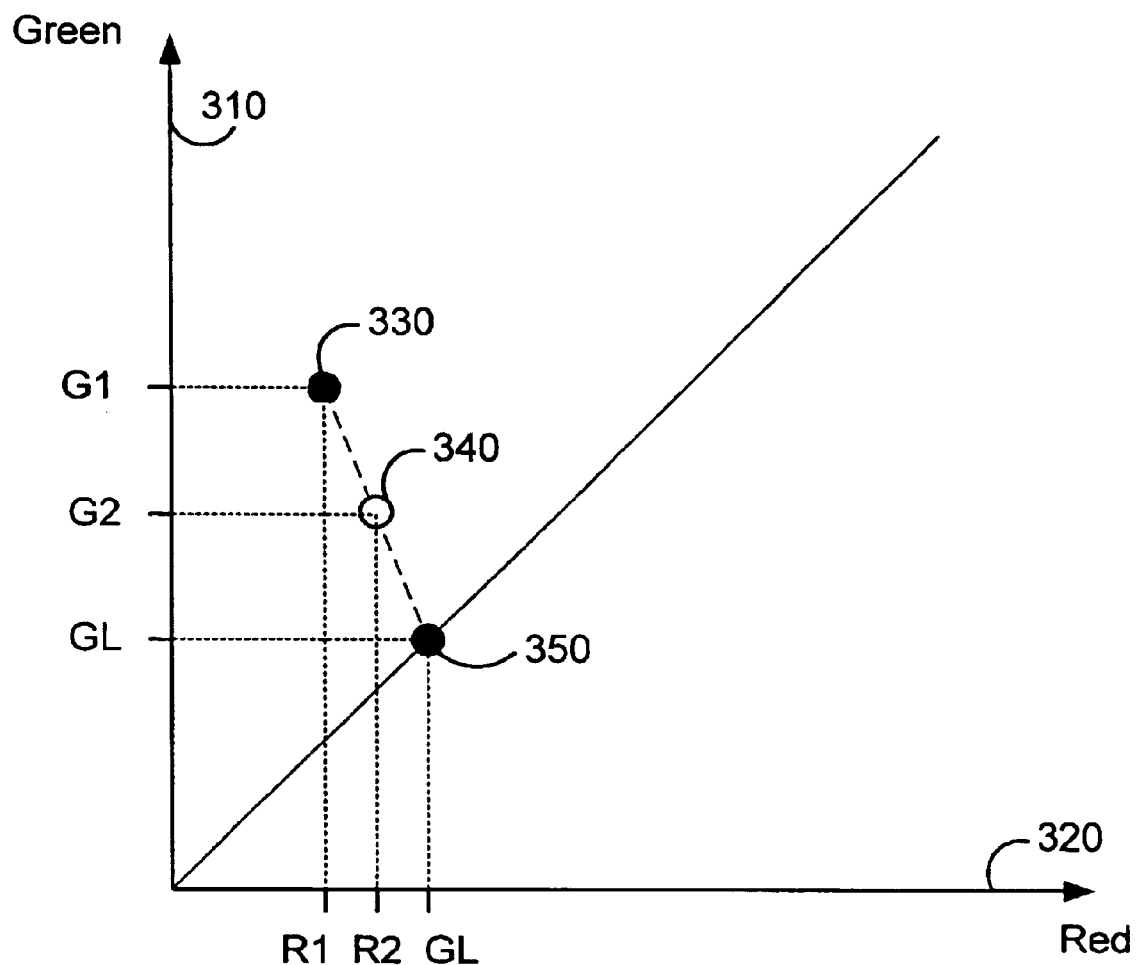
FIG. 3 is a schematic diagram illustrating correcting colors in RGB color space after a luminance adjustment.

FIG. 3 illustrates correcting color saturation at a pixel in an image based on a luminance change caused by a previous adjustment to the image. The pixel specifies a color in an RGB color space including a green component 310, a red component 320, and a blue component (not shown to simplify the illustration) specifying corresponding color values between zero and one. After the previous adjustment, the pixel has a first color 330 specified by a red ("R1"), a green ("G1") and a blue ("B1," not shown) value.

The first color 330 is corrected by a saturation adjustment that is controlled by a saturation parameter ("S" with values between −1 and +1). Using the saturation parameter S, a saturation scale factor ("f" with values between 0 and 1) is defined as $$f=cv\uparrow[S\cdot Cf(S)],$$

where cv is a constant (having a value such as about 4.0) and Cf(S) is a step-like function that specifies a first function value (of about 0.5) for positive values of the saturation parameter S and a second function value of one otherwise. If the saturation parameter S is about zero, the saturation scale factor f is about one. If the saturation parameter S is about one, the saturation scale factor f has about the same value as the constant cv. If the saturation parameter S is about minus one, the saturation scale factor f has a value of about the inverse of the constant cv.

To correct the color saturation, a second color 340 is specified for the pixel. The second color 340 is defined on a line that connects the first color 330 to a grayed color 350. The grayed color 350 has the same gray value ("GL") for red, green and blue components. The gray value is defined by the first color's luminosity as $$GL=0.30R1+0.59G1+0.11B1.$$

The second color 340 has red ("R2"), green ("G2") and blue ("B2," not shown) values depend upon the saturation scale factor f and the luminance change ("dL") caused by the previous adjustment of the image. The luminance change dL is a relative or an absolute change. The second color 340 is defined using parameters k1=(1−f)dL and k2=1−k1 as $$R2=k1GL+k2R1$$

$$G2=k1GL+k2G1$$

$$B2=k1GL+k2B1.$$

Because the parameters k1 and k2 depend upon the saturation parameter S (through saturation scale factor f), the strength of the saturation adjustment can be controlled by setting a value for S, for example, in a user interface. In addition to the saturation parameter S, the second color 340 also depends on the luminance change dL. When dL is about zero, so is k1. Thus k2 is about one, and the second color 340 is about the same as the first color 330, independent of the saturation parameter S. On the other hand, when dL is substantially different from zero, k1 and the second color 340 depend upon the saturation parameter S.

Instead of luminance, the previous adjustment can change the chrominance at the pixel. Accordingly, luminance ("L1") can be corrected based on a color change dC at the pixel. The color change dC is specified as discussed above with reference to FIG. 2. In L*a*b* color space, a corrected luminance ("L2") is obtained as $$L2=k2L1,$$

where k1 and k2 are defined above and the scale factor f, instead of saturation, now controls the amount of luminance correction applied after the chrominance adjustment at the pixel. The previously adjusted image can also be corrected by applying filters that sharpen or blur the image. For example after lightening shadow regions, a user may desire to adjust sharpness in the lightened shadow regions only.

In an alternative implementation, the previous adjustment can be followed by a directional correction. The directional correction applies only after specific changes at a pixel in the image. For example, correction is applied only to pixels where the previous adjustment lightens shadows, but no correction is applied if highlights are darkened. (Or vice versa.) For correcting only previously lightened shadows, a measured change (dLA) of a local attribute is multiplied by a first factor (p1) and a second factor (p2) to generate a modified change (dLA') as $$dLA'=dLA\,p1p2.$$

The first factor p1 ensures that the directional correction is applied only to regions that have low luminance (shadows) in the original image. Thus the first factor p1 depends on the luminance (L0) at the pixel in the original image as $$p1=\exp(-d1L0^2),$$

where d1 is a first constant (having a value such as about 4.0).

The second factor p2 ensures that the directional correction is applied only to regions where the luminance value L1 is larger after the previous adjustment than in the original image. The second factor p2 is defined as $$p2=\text{sigmoid}(d2\,(L1-L0)), \text{ where}$$

$$\text{sigmoid}(x)=1/[1+\exp(-x)]$$

and d2 is a second constant (having a value such as about 2.0). For correcting only highlights that have been darkened in a previous adjustment, similar equations can be defined.

Optionally, a previous adjustment can be neutralized before chrominance correction. The neutralization sets luminance to values in the original image without altering the chrominance values. In L*a*b* color space, an adjusted luminance value L1 is set to be equal to an original value L0 in the original image for each pixel without altering the adjusted chrominance values a1 and b1 at the pixel. In RGB color space, each color component (red1, green1, and blue1) is corrected by the luminance difference L0–L1 as $$red1'=red1+L0-L1,$$

$$green1'=green1+L0-L1 \text{ and}$$

$$blue1'=blue1+L0-L1,$$

where the neutralized values are indicated by apostrophe.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programing language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method for processing a digital image, the method comprising:
    modifying the digital image at a location within the image, the modification causing a change of a first local attribute of the image at the location;
    measuring the change of the first attribute at the location; and
    adjusting a second local attribute of the image at the location based on the measured change of the first local attribute, the second local attribute being different from the first local attribute.

2. The method of claim 1, wherein:
    modifying the digital image includes applying a tone selective local adjustment at the location.

3. The method of claim 2, wherein the tone selective local adjustment specifies separate adjustments for shadows and highlights.

4. The method of claim 1, wherein:
    modifying the digital image includes changing contrast or brightness of the image at the location.

5. The method of claim 1, wherein the first local attribute is luminance.

6. The method of claim 5, wherein the second local attribute is chrominance.

7. The method of claim 5, wherein the second local attribute is color saturation.

8. The method of claim 1, wherein:
    adjusting the second local attribute includes applying a filter at the location.

9. The method of claim 8, wherein the filter sharpens the image.

10. The method of claim 8, wherein the filter blurs the image.

11. The method of claim 1, wherein the first local attribute is chrominance.

12. The method of claim 11, wherein the second local attribute is luminance.

13. The method of claim 1, wherein:
    measuring a change of the first local attribute includes measuring an absolute change of the first local attribute.

14. The method of claim 1, wherein:
    measuring a change of the first local attribute includes measuring a relative change of the first local attribute.

15. The method of claim 1, wherein:
    the adjustment to the second local attribute is a function of the measured change of the first local attribute.

16. The method of claim 1, wherein:
    adjusting the second local attribute of the image includes applying a directional correction, the directional correction being a correction being that only applies if the first local attribute has been changed in a specific direction.

17. A software product, tangibly embodied in a machine-readable medium, for processing a digital image, the software product comprising instructions operable to cause one or more data processing apparatus to perform operations comprising:
    modifying the digital image at a location within the image, the modification causing a change of a first local attribute of the image at the location;
    measuring the change of the first local attribute at the location; and
    adjusting a second local attribute of the image at the location based on the measured change of the first local attribute, the second local attribute being different from the first local attribute.

18. The software product of claim 17, wherein:
    modifying the digital image includes applying a tone selective local adjustment at the location.

19. The software product of claim 18, wherein the tone selective local adjustment specifies separate adjustments for shadows and highlights.

20. The software product of claim 17, wherein:
    molding the digital image includes changing contrast or brightness of the image at the location.

21. The software product of claim 17, wherein the first local attribute is luminance.

22. The software product of claim 21, wherein the second local attribute is chrominance.

23. The software product of claim 21, wherein the second local attribute is color saturation.

24. The software product of claim 17, wherein:
    adjusting the second local attribute includes applying a filter at the location.

25. The software product of claim 24, wherein the filter sharpens the image.

26. The software product of claim 24, wherein the filter blurs the image.

27. The software product of claim 17, wherein the first local attribute is chrominance.

28. The software product of claim 27, wherein the second local attribute is luminance.

29. The software product of claim 17, wherein:
    measuring a change of the first attribute includes measuring an absolute change of the first local attribute.

30. The software product of claim 17, wherein:
    measuring a change of the first local attribute includes measuring a relative change of the first local attribute.

31. The software product of claim 17, wherein:
    the adjustment to the second local attribute is a function the measured change of the first local attribute.

32. The software product of claim 17, wherein:
    adjusting the second local attribute of the image includes applying a directional correction, the directional correction being a correction that only applies if the first local attribute has been changed in a specific direction.

* * * * *

UNITED STATES PATENT AND TRADEMARK OFFICE
CERTIFICATE OF CORRECTION

| | | |
|---|---|---|
| PATENT NO. | : 7,071,948 B2 | Page 1 of 1 |
| APPLICATION NO. | : 10/690977 | |
| DATED | : July 4, 2006 | |
| INVENTOR(S) | : Gregg D. Wilensky | |

It is certified that error appears in the above-identified patent and that said Letters Patent is hereby corrected as shown below:

Column 9, line 31, after "first" insert --local--;

Column 10, line 7, delete the second occurrence of "being";
 line 57, after "function", insert --of--.

Signed and Sealed this

Twenty-first Day of November, 2006

JON W. DUDAS
*Director of the United States Patent and Trademark Office*